Aug. 16, 1927.

F. G. CREED

1,639,213

TELEGRAPHIC RECEIVING APPARATUS

Filed Oct. 25. 1924 7 Sheets-Sheet 1

F. G. CREED

1,639,213

TELEGRAPHIC RECEIVING APPARATUS

Filed Oct. 25. 1924        7 Sheets-Sheet 5

Patented Aug. 16, 1927.

1,639,213

UNITED STATES PATENT OFFICE.

FREDERICK GEORGE CREED, OF CROYDON, ENGLAND.

TELEGRAPHIC RECEIVING APPARATUS. REISSUED

Application filed October 25, 1924, Serial No. 745,935, and in Great Britain November 5, 1923.

This invention has reference to telegraphic receiving apparatus suitable for use with telegraphic transmitting apparatus of various kinds adapted to transmit groups of signals representing for example letters or other characters (hereinafter referred to for brevity as letters), or spaces to be reproduced, or some movement to be effected or controlled. It also has reference to telegraphic printing apparatus suitable for use with such receiving apparatus.

The object of the invention is to provide improved telegraphic receiving apparatus of simple and reliable construction adapted to control the operation of printing or other apparatus in accordance with the nature of successive groups of signals received.

It also has for its object to provide telegraphic receiving apparatus of simple construction specially adapted to receive groups of signals transmitted according to the five or other multiple unit system, either on the start and stop method, or continuously with or without a short interval between the groups.

It also has for its object to provide a combined telegraphic receiving and printing apparatus of relatively simple construction and capable of being operated in a rapid and reliable manner in accordance with received groups of signals.

Broadly, these objects are obtained by controlling the action of printing mechanism or other mechanism in accordance with groups of received signals, by a series of movable controlling devices (hereinafter called for brevity and distinction control fingers) each of which is adapted to be independently moved from an inoperative position to an operative position, by a movable device (hereinafter called for brevity and distinction a finger setter) which, during the reception of a group of signals, is brought opposite the successive control fingers and is caused to act or not to act on the control finger opposite which it happens to be on the receipt of a signal, according to the nature of the signal, whereby the control fingers will, during the receipt of a group of signals, be set or caused to assume relative positions corresponding to the nature of said group of signals and thereby serve to control the printing mechanism or other mechanism associated therewith, in the desired manner.

In the accompanying illustrative drawings.

Figure 8:
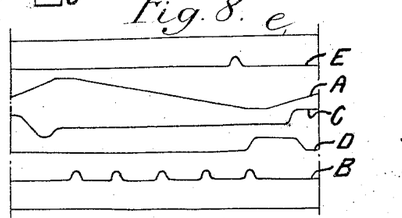
Fig. 8 shows, diagrammatically, a developed view of the several cam grooves in a cam sleeve used in the receiver.

According to the construction of the telegraphic receiver shown in Figs. 1 to 5 inclusive, which is at present the one preferred, the finger setter consists in this example of a horizontal pin $a$ mounted in a horizontal endways movable link $b$ carried by two parallel lever arms $c$ and $d$ pivoted at $c^1$ and $d^1$ respectively. One arm, namely $c$, carries a roller $c^2$ extending into a cam groove A, (hereinafter called the traversing cam) formed in the periphery of a sleeve $e$ carried by a rotary shaft $f$ mounted in bearings $f^1$. The other lever arm $d$ may, as shown, form part of a two armed lever, the movement of the second arm $d^2$ of which can be utilized for some useful purpose, as for instance for operating, through a link $g$, tape feeding mechanism $h$ in telegraphic printing apparatus associated with the receiver $i$ is a series of control fingers. The pin $a$ is movable endways in and at right angles to the link $b$ and towards the series of control fingers $i$, against the action of a spring blade $k$, carried by the link $b$ and which acts on a collar $a^1$ on the pin $a$ and afterwards serves to return the pin $a$ to its normal backward position. The traversing cam A is so shaped, (see Fig. 8) that at each rotation thereof it will cause the pin $a$, to move in one direction in front of the series of control fingers $i$, and then be returned more quickly to its starting position. The striker for moving the pin $a$ endways against the action of its spring blade $k$, consists of a horizontal spring blade $m$ forming one arm of a bell crank lever the other arm $n$, of which is provided with a roller $n^1$ extending into another cam groove B (hereinafter called for distinction the striker cam) formed in the periphery of the said sleeve $e$. The latter cam is so formed, (see Fig. 8) that it will move the striker towards the pin $a$ when the latter comes opposite each adjustable member $i$ in turn. If the receiver is designed to work on the five unit system, there will be five control fingers $i$ opposite which the pin $a$ will be successively brought, and the striker $m$ will be caused to make five successive movements towards the said pin. The striker is adapted to be lowered and raised, so as to move it into an operative or inoperative position in relation to the pin $a$, by a lever arm $o$ having a slotted end through which the striker blade $m$ extends, and which is fixed to a longitudinal rock shaft $r$ adapted to be rocked through another lever arm $s$ on the shaft and a link $t$ by the armature lever $u$ of a polarized relay $v$, on the reception of positive and negative signals. The arrangement is such that when say a positive signal is received by the relay $v$, the striker blade $m$ is moved by the relay armature lever $u$, link $t$, lever arm $s$, rock shaft $r$ and slotted lever arm $o$ into its lower operative position and into the plane of the pin $a$ so that when it moves towards the pin $a$, it will move the latter endways and cause it to displace the control finger $i$ that is opposite to it, whilst when say a negative signal is received, the striker will be raised by the means mentioned, into its inoperative position so that when it moves towards the pin $a$ it will not act thereon and the control finger $i$ then opposite the pin $a$ will not be displaced.

When the receiver constructed as above described, is designed to work on the start and stop method, as in the example shown, the cam sleeve $e$ is mounted freely on the driving shaft $f$ of the receiver which is provided with a ratchet wheel $w$ (Fig. 4) formed by a ring of teeth on the spindle $f$, and to the sleeve is pivoted a spring pawl $x$ that is adapted, when released, to engage the ratchet wheel $w$, under the action of its spring $x^1$, and cause the sleeve to rotate with the shaft. Normally, the pawl is held out of gear with the ratchet wheel by a movable detent $y$ pivoted at $y^1$ and connected to the aforesaid rock shaft $r$ through a link $t^1$ and the lever arm $s$ and arranged to be oscillated or reciprocated by the aforesaid relay $v$ when the rock shaft is operated. The arrangement is such that each time a group of signals is transmitted and received the first or starting signal received, say a positive signal, causes the relay $v$ to withdraw the detent $y$ from the pawl $x$ which then automatically engages the ratchet wheel $w$, under the action of its spring $x^1$, whereupon the pawl and sleeve will commence to rotate. When the combined pawl $x$ and sleeve $e$ have moved through one complete revolution, the detent $y$, which meanwhile will have been moved backwards and forwards by the relay, owing to the receipt of negative and positive signals, will finally be moved into its forward position (Figs. 2 and 4) upon the receipt of say a negative stopping signal and will re-engage the pawl and move it out of engagement with the ratchet wheel $w$ and arrest the sleeve. Means, as for example a spring pressed roller $z$, (Fig. 2) carried by a spring controlled lever $z^1$, may be provided to prevent backward movement of the sleeve and pawl.

Figure 3:
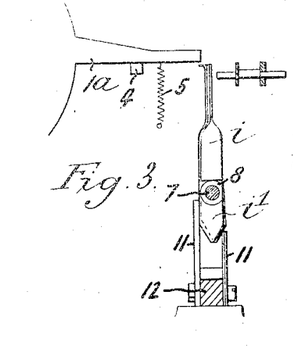
Fig. 3 is a section corresponding to the line III—III of Fig. 2.
Figure 4:
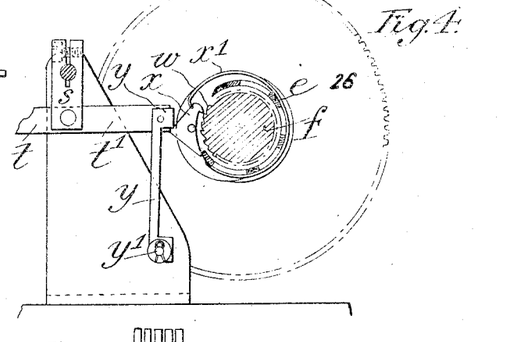
Fig. 4 is a section corresponding to the line IV—IV of Fig. 2.

As hereinbefore stated, the telegraphic transmitting apparatus associated with the receiver can be of various kinds. Also, the printing apparatus used with the receiver can be of various kinds. Conveniently, and by way of example, the printing apparatus (hereinafter called for brevity the printer) which is combined with a receiver of the kind just specifically described, adapted to work on the start and stop method, may comprise a series of annular combs 1, mounted to turn to a limited extent upon a stationary cylindrical support 2 carried by a suitable frame or base plate 3, forming part, it may be, of the base plate of the receiver. The combs are suitably and relatively notched in known manner, to suit the multiple unit start and stop system of working adopted, and each of them is provided with a horizontal arm $1^a$ by which it can be turned to a small extent. Assuming, for example, that the receiver is designed to work according to the five unit start and stop system, there will be five combs. The comb arms $1^a$ normally bear against a stop 4 under the action of separate springs 5 (Fig. 3). Arranged around the combs are a series of spring actuated selector bars 6 corresponding in number to the letters to be printed and a space to be formed, the bars being pivoted at $2^a$ (Fig. 7) on a stationary support or extension $2^b$ of the cylinder 2 and having inwardly projecting arms $6^a$.

Figure 1:
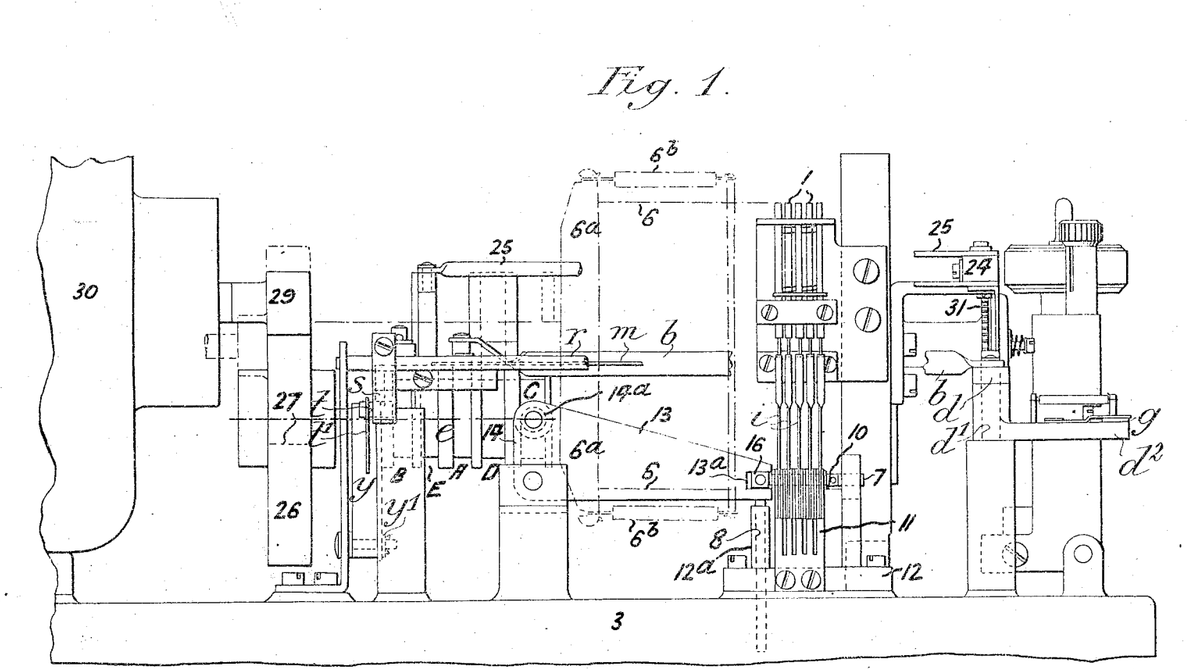
Figs. 1 and 2 show respectively in side elevation and plan, part of one construction of telegraphic receiver according to the present invention combined with printing apparatus.
Figure 2:
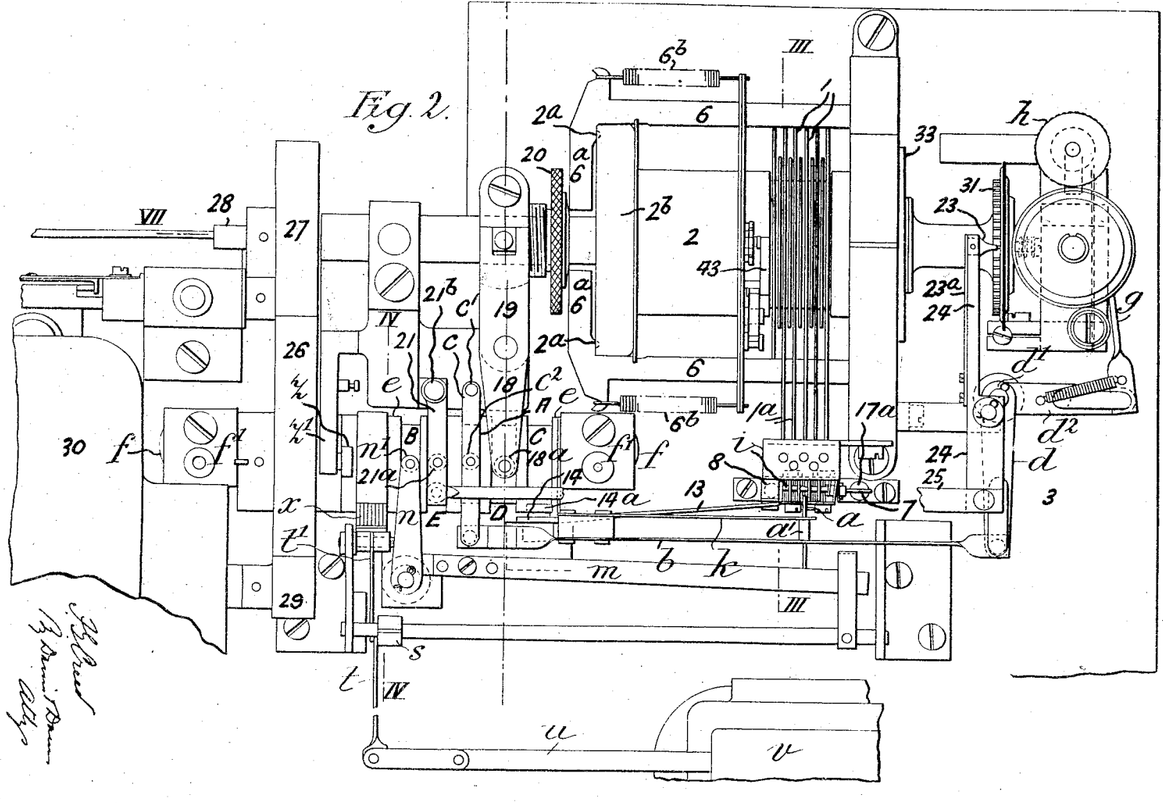
Figure 5:
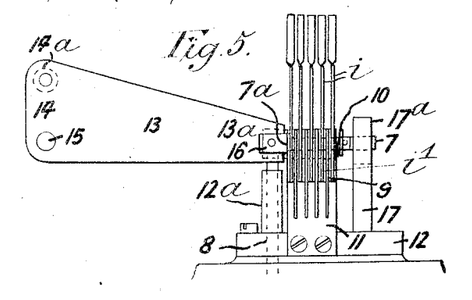
Fig. 5 shows in front elevation, a set of comb setting devices and associated parts.
Figure 6:
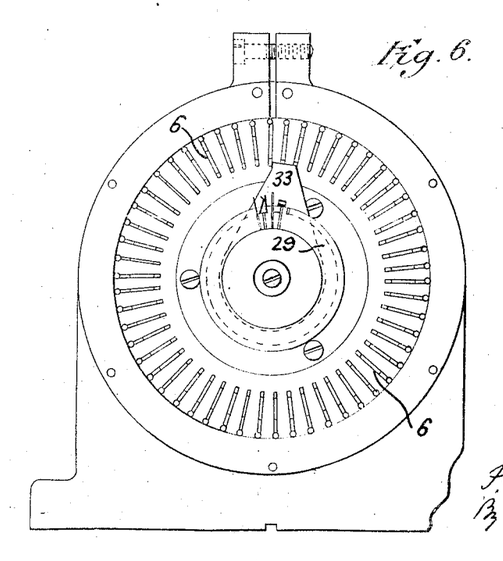
Fig. 6 shows in end elevation and Fig. 7 in longitudinal section on the line VII—VII of Fig. 2, the printing apparatus associated with the receiver shown in Figs. 1 to 5 inclusive.

Arranged in the same vertical planes as the comb arms $1^a$ but normally to one side thereof, are five control fingers $i$. These fingers are pivoted on a horizontal pin 7, carried by a vertically movable holder 8, the fingers $i$ being separated by distance pieces 9, (Fig. 5) and pressed together and against an abutment $7^a$ on the pin 7 by a spring 10 so that they will be held by friction in the operative and inoperative positions into which they are moved. The fingers $i$, are normally held in a vertical position into which they are moved by causing their lower extending ends $i^1$, made of V shape (see Fig. 3) to descend by means of the holder 8, and enter a vertical slot that may be formed for example between plates 11 fixed to a stationary support 12, the device constituting a finger restoring or returning device. The pin 7 carrying the control fingers $i$ may be fixed at one end to its holder 8, which may, as shown in Figs. 1 and 5, be a rod fitted in a vertical guide, formed for example by hole in a tube $12^a$, and be capable of being raised and lowered by a bell crank lever 13—14, pivoted at 15, and one arm of which is slotted at $13^a$ and engaged with a trunnion portion 16 mounted on the holder 8. The other end of the horizontal pin 7 is arranged to rise and fall in the slotted upper end $17^a$ of a fixed guide 17. The unslotted arm 14 of the said lever 13—14, is provided with a roller $14^a$ arranged to work in a cam groove C (hereinafter called for distinction the comb setting cam) formed in the periphery of the cam sleeve $e$. The said cam sleeve is also formed with another cam groove D (hereinafter called for distinction the selector bar cam) in which works a roller $18^a$ carried by one arm 18 of a lever the other and forked arm 19 of which is arranged and adapted to move a tubular flanged slide 20 endways against the inwardly extending arms $6^a$ of the spring controlled selector bars 6 and move these bars away from the combs 1 during part of the revolution of the cam sleeve $e$ and afterwards to release the selector bars and permit them to be moved towards and against the combs by their springs $6^b$, and enable that selector bar 6 corresponding to the group of the letter or space signals previously transmitted and received, to move into its operative position. The cam sleeve $e$ is also provided with another cam groove E (hereinafter called for distinction the printing cam) into which extends a roller $21^a$ carried by a lever 21 pivoted at $21^b$ and the other end of which is adapted to actuate a striker 23, or other device, for effecting printing of an ordinary character on a recording tape, or to form a space thereon. In the example shown, the striker 23 is pivoted to a lever 24 connected by a link 25 to the lever 21. The striker is provided with a flat rear side against which bears the free end of a flat blade spring $23^a$ fixed to the lever 24 so as to allow the striker to yield in a lateral direction and form a safety device in the event of its coming in contact with the printing wheel, hereinafter described, when the latter is in rotation, as may happen for example in the event of the combined receiver and printer being turned backward by hand during adjustment thereof.

In this example, the traversing cam A is so shaped that when the cam sleeve $e$ (Fig. 8) is in its normal or starting position, the pin $a$ carried by the link $b$ is opposite the central control finger $i$ and upon the sleeve being moved through one seventh of a revolution, the pin is moved to the left hand side (Figs. 1 and 2) of the group of fingers. During the succeeding second, third, fourth, fifth and sixth sevenths of the revolution of the cam A, it moves the link forward and brings the pin in succession opposite the first, second, third, fourth and fifth fingers, and during the last seventh of a revolution it returns the pin $a$ to its central position opposite the central finger. The striking cam B is so shaped that during the rotation of the sleeve $e$ it will move the striker $m$ five times towards and from the pin $a$, each forward movement being of sufficient extent to cause the said pin $a$ to move one or other of the control fingers $i$ into its operative position if the striker be in the plane of the pin $a$. The selector bar cam D is so shaped that during part of the sixth-seventh and of the last seventh part of the revolution of the cam sleeve $e$, it will move the selector bars 6 from the combs 1 to release the latter and permit them to be returned to or toward their normal position by their springs and be reset by the comb adjusting fingers $i$, and during the remaining portion of the seventh part of the revolution, it will permit the selector bars to return into contact with the combs and permit that one of them corresponding to the group of signals received to move into its operative position. The comb setting cam C is so shaped that it will come into action immediately the combs are released and raise the comb setting fingers $i$ to reset the combs. The printing cam E is so shaped that at the commencement of the sixth seventh part of the rotation of the cam sleeve $e$, it will actuate a printing lever through the striker 23, to cause a letter to be printed, or a space to be left, on the recording tape immediately before the selector bars 6 are withdrawn from the combs 1.

Figure 7:
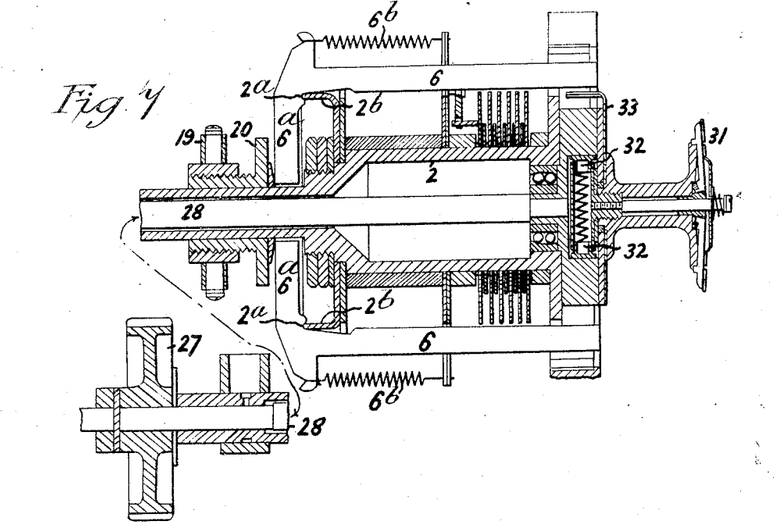

Constantly driven from a toothed wheel 26 on the rotary shaft $f$ carrying the sleeve $e$ is another toothed wheel 27 which drives another shaft 28 at a greater speed than that of shaft $f$, say 30 to 50% higher speed. The toothed wheel 26 is driven by a pinion 29 fixed to the driving shaft of an electric motor 30. The shaft 28 extends through the stationary cylinder 2 carrying the notched combs 1 and from it a rotary printing wheel 31 is driven by friction, as through a friction clutch 32 (Fig. 7). The printing wheel may, as in the construction shown, be constructed and driven like the printing wheel described and shown in the specification of former Letters Patent No. 1,534,164 granted to me, and is adapted to be arrested by one or other of the selector bars 6 that is enabled by the combs 1, when set for any particular letter, or for a space, to move into the path of a rotary arm 33 on the printing wheel, as heretofore. Surrounding the shaft 28 is the sleeve or collar 20 that can, as hereinbefore described, be moved along it and into contact with the inwardly extending arms 6ª of the selector bars 6 by the lever 18—19 operated by the selector bar cam D, so as to move the selector bars away from the notched combs 1 after each printing or spacing operation, in order to release the printing wheel 31 and also the combs 1 and permit the latter to be moved to or toward their original positions.

The arrangement of the combined receiver and printer is such that normally the control fingers $i$ are held by their carrier 8 in their upward set positions into which they were previously moved by the pin $a$, and the cam sleeve $e$ is at rest, whilst the shaft $f$ and the shaft 28 are constantly rotated by the motor 30 but at different speeds. Each time a group of signals is received, the first or starting signal received, say a positive signal, causes the polarized relay $v$ to move back the detent $y$ so as to release the pawl $x$ carried by the sleeve $e$ and enable it to engage the ratchet wheel $w$ on shaft $f$ and be rotated thereby. The cam sleeve will consequently commence to rotate and first cause the comb setting cam C to lower the carrier 8 carrying the fingers $i$ and cause the fingers to be moved into their vertical position by the restoring or returning device 11 and then partly raise them into their normal inoperative position. The cam sleeve $e$ will also cause the traversing cam A, striker cam B, selector bar cam D and printing cam E to act in the manner hereinbefore described. During the operation of the traversing and striking cams A and B, the relay $v$ will, each time a positive signal is received, cause the striker $m$ to be brought into position to actuate the pin $a$ and move the corresponding control finger $i$ into an inclined and operative position, and each time a negative signal is received, the relay will move the striker into its inoperative position so that it will be inoperative on the pin $a$ and control finger $i$.

During the reception of a group of signals as described, the printing wheel 31, will have been arrested and held in the printing or space forming position by the selector bar 6, corresponding to the letter or space signals last previously received, engaging the arm 33 on the printing wheel. During the sixth step in the revolution of the cam sleeve $e$, the type lever actuating device 23 is operated by the printing cam E to effect printing, if a type lever is held in the printing position, or to effect spacing. During part of the sixth seventh and of the seventh step in the revolution of the cam sleeve $e$, the selector bars 6 are moved away from the combs 1 by the selector bar cam D, thereby releasing the printing wheel 31, and also the combs, which are then free to be moved to or towards their normal positions by their springs 5 and be reset by movement, under the action of the comb setting cam C, of the control fingers $i$ which have just previously been reset by the group of signals just received. Just before the end of the seventh step of the revolution of the cam sleeve $e$, the selector bar cam D will permit the selector bars 6 to return towards the combs 1 and of the selector bar 6 corresponding to the group of letter or space signals last received, moving into its operative position to arrest the rotary arm 33 of the printing wheel 31. The sleeve is finally arrested at the end of one revolution by the detent $y$ disengaging the pawl $x$ from the ratchet wheel $w$ on the shaft $f$, the detent being, for this purpose, moved into its operative position by the armature lever $u$ of the relay $v$ under the action of the seventh or stopping signal, which may be a negative one. The foregoing operations can then be repeated on the receipt of the next group of signals transmitted.

Figure 9:
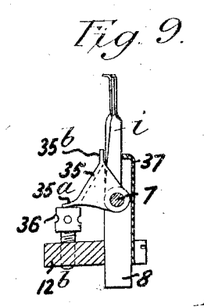
Fig. 9 is a detail view showing modified means for restoring the comb setting devices to normal position.

Fig. 9 shows a modified arrangement of control finger restoring or returning device. In this case, there is mounted on the pin 7 and adjacent to each control finger $i$, a lever 35 one arm 35ª of which is adapted, when the pin 7 is lowered by its holder 8, to abut against an adjustable stop 36 carried by a stationary plate 12ᵇ in which the holder 8 moves, and cause another arm 35ᵇ of the lever to act against the adjacent finger $i$ and move it into the vertical position and against a fixed abutment 37 common to all the fingers.

Figure 10:
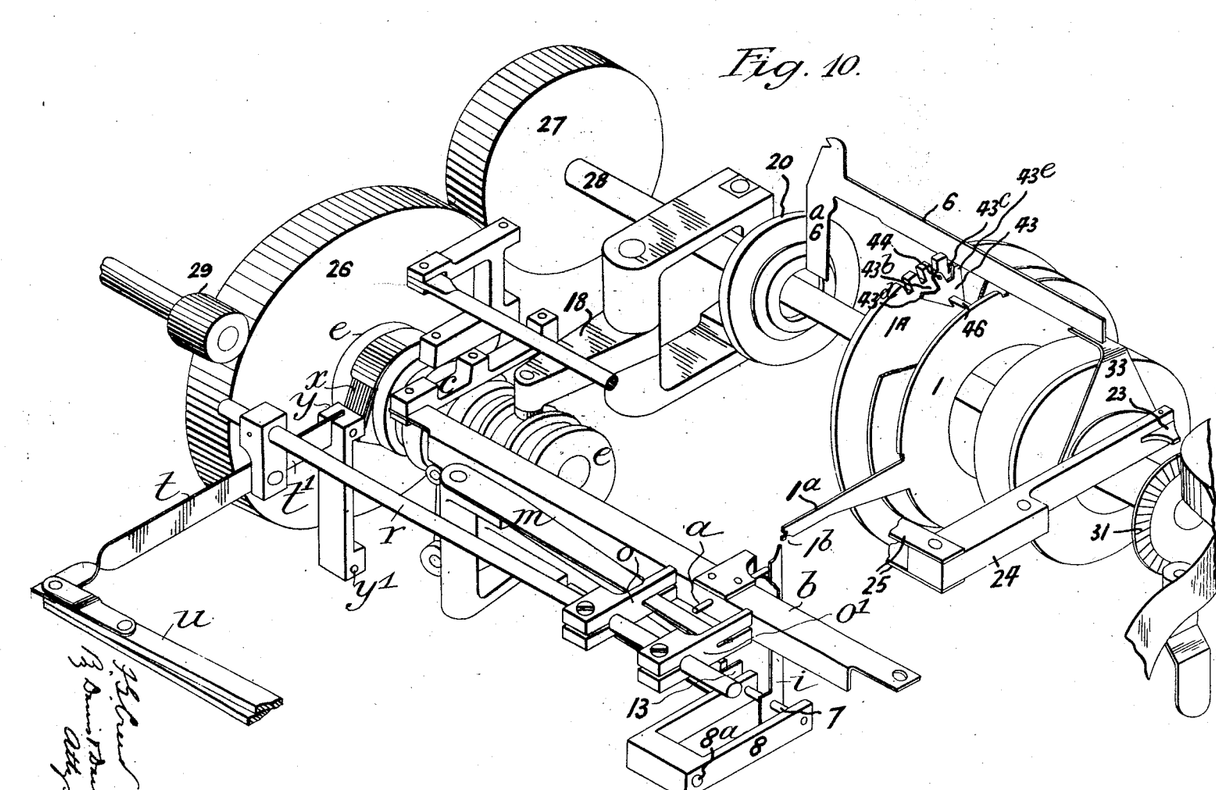
Fig. 10 is a diagrammatic view showing a combined receiver and printer according to the invention embodying a modified arrangement of comb setting devices.
Figure 11:
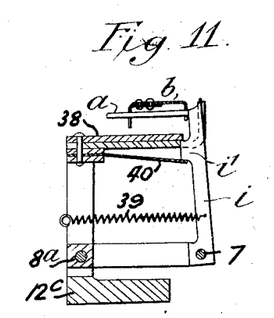
Fig. 11 is a sectional detail view of this modified arrangement.

Fig. 10 shows, diagrammatically, the receiver and printing apparatus hereinbefore specifically described except that it embodies a modified way of mounting the control fingers, shown more clearly in Fig. 11. In this case the control fingers $i$ are mounted on a pin 7 carried by a bifurcated holder 8 that is pivoted at 8ª in a support 12ᶜ and is adapted to be raised and lowered by a comb setting cam and lever like the comb setting cam D and lever 13—14 hereinbefore described, except that the cam is adapted upon each rotation, simply to move the pin 7 and control fingers $i$ upward into their operative position and downward into their inoperative position, the free end of the lever 13 engaging the adjacent end of the pin 7 for the purpose. The control fingers $i$ are each provided with a lateral lug $i^1$ normally held, in the position shown in Fig. 11, against a stationary plate 38 by a spring 39 and bears downwards upon a spring blade 40. 41 is a slotted guide plate for the fingers. The arrangement is such that when a finger $i$ is displaced sideways by the pin $a$ and off the spring blade 40, the latter will rise and hold the finger in its displaced position when the pin $a$ moves backward. When the displaced control fingers $i$ are raised by their pin 7 to set the corresponding combs 1, each displaced control finger will enter a recess $1^b$ in the underside of the corresponding comb arm $1^a$ and be held thereby when they rise above the spring blades. When the control fingers are afterwards moved downwards, the displaced fingers will become disengaged from the recessed ends of the comb arms and be moved backward under the action of their spring 39 and bear against the plate 38 with their lugs $i^1$ above the ends of the spring blades 40 which will be moved into their lower inoperative position, shown in Fig. 11, as the control fingers descend. In Fig. 10, the free end of the striker blade $m$ passes through two slotted levers $o$ and $o^1$ carried by the rock shaft $r$.

Figure 12:
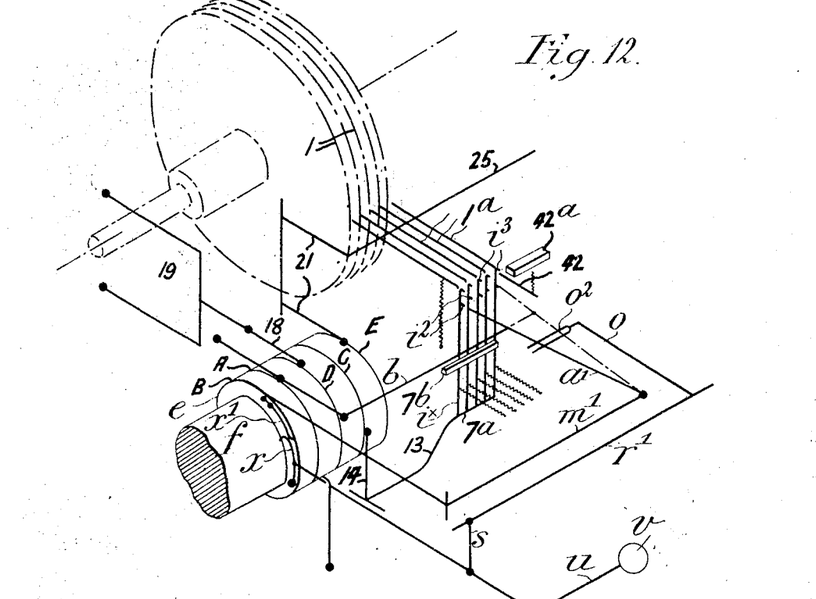
Fig. 12 is a diagrammatic view showing parts of a modified construction of receiver with printer.

In the modified construction of receiver shown diagrammatically in Fig. 12, the comb setting mechanism, which may be associated with the arms $1^a$ of a number of rotary notched combs 1 mounted to turn upon a stationary cylindrical support 2, as in the arrangement shown in Figs. 1 to 8 inclusive, comprises a series of spring controlled vertical comb setting fingers $i^x$ pivoted at their lower ends to a vertically movable support $7^a$, and normally held against a stationary bar $7^b$ by their springs, each bar or finger being provided on one side with two lateral projections $i^2$, $i^3$ arranged one above the other. Arranged near to the upper projections $i^3$ and normally extending below them are corresponding spring pivoted latches 42 above which is a stop bar $42^a$. On a rotary spindle $f$ is mounted a sleeve $e$ with striker cam B, such as hereinbefore described, and with which co-acts one arm $n'$ of a lever pivoted at $n^2$ and the other arm $m^1$ of which, serving as the equivalent of the strike $m$ (Figs. 1 and 2), is moved by the action of the said cam B laterally towards and from the comb setting fingers $i^x$. Pivoted to the free end of the lever arm $m$ is a horizontal arm $a^1$ constituting a finger setter that can be moved to and fro horizontally by means, such as a link $b$ and a cam A on the sleeve $e$, so as to bring its free end successively into the planes of the comb setting fingers $i^x$. Embracing the pivoted arm $a^1$ is a device, such as a fork $o^2$, adapted to be moved vertically by a lever arm $o$ fixed to a rock shaft $r$ provided with a second arm $s$ operated through a link $t$ by the armature lever $u$ of a relay $v$. The support $7^a$ is raised and lowered by a lever 13—14 operated by a cam groove C in the sleeve $e$.

The arrangement is such that after the starting of the spindle $f$, on the reception of a starting signal by the relay $v$, which acts through the armature lever $u$ and links $t$, $t^1$ on the pawl $x$ carried by the sleeve $e$, as hereinbefore described, the lever arm $m^1$ will be moved to and fro laterally by the cam A and move the arm $a^1$ towards and from the comb setting fingers $i^x$ opposite which it will be successively brought by the action of the link $b$ and cam B, and the said arm will be raised and lowered by the relay controlled fork $o^2$ so as to bring its free end successively opposite the lower lateral projections $i^2$ on the said comb setting fingers $i^x$ when say positive signals are received, and lowered, so as to be out of line with the said projections, when negative signals are received. When a positive signal is received and the arm is brought into the plane of a comb setting finger $i^x$, the finger will be moved, by inward movement of the arm $a^1$, into a position below the corresponding comb lever $1^a$, in which position it will automatically be held by its corresponding latch 42. When a negative signal is received, the arm $a^1$ will be moved out of line with the projection $i^2$ of the corresponding comb setting finger $i^x$ which therefore will not be moved when the arm moves inward. In this way the comb setting fingers $i^x$ will be set to correspond to the group of letter or space signals received, as in the arrangement shown in Figs. 1 to 5. At the end of the reception of such group of signals, the comb setting fingers $i^x$ are raised by the lever 13—14 and cam C to reset the combs 1 and are afterwards returned to their normal lowered position.

D is a cam groove in the sleeve $e$ for operating the lever 18—19, used for moving the selector bars from the combs, and E is a cam groove in the sleeve for operating a lever 21 and link 25 for operating the striker lever used for moving the type levers of the printing wheel into their printing positions, as in the arrangement shown in Figs. 1, 2, 6 and 7.

With the notched combs and selector bars 6 hereinbefore described, may be associated another notched comb, called the shift comb, that can be caused by the operation of one or other of two space selector bars, on the receipt of one or other of two special groups of signals for the purpose, transmitted under the control, for instance, of one or other of two space or shift keys in the telegraphic signal transmitter used with the receiver, or otherwise, to be rotated through a short space so as to permit of one or other selector bar of a second group of selector bars, corresponding to characters different to those to which the first group correspond, say for instance to figures and special characters, to be brought into action for holding the type printing wheel 31 in position to print figures or special characters. The second group of selector bars may be controlled by the same key operated device in a telegraphic transmitter as are used for controlling the first group of selector bars.

Figs. 2, 7, 10 and 13 show an arrangement of this kind wherein 1$^A$ is a shift comb mounted to turn upon the cylindrical support 2. 43 is a plate pivoted on a pin 44 fixed to a slotted ring 45 fixed to the support 2 and through which the selector bars 6 extend. The plate 43 is provided with a notched inner portion 43$^a$ engaging a pin 46 fixed to the shift comb 1$^A$ and with two outer peripheral notches 43$^b$ and 43$^c$. 6$^A$ and 6$^B$ are the two selector space bars arranged to act upon the end portions 43$^d$ and 43$^e$ respectively of the pivoted plate 43. 6$^x$ are selector bars constituting the second group of selector bars. Each of these bars is arranged adjacent to one of the ordinary selector bars 6, the two forming a pair, the combs being so cut as to allow either of the two bars to move into the operative position for the same group of signals, the shift comb determining, by its position, which of the two shall come into such position. The selector bars 6$^c$, 6$^d$ between the two selector space bars 6$^A$, 6$^B$ are odd bars corresponding to any desired characters, as for instance a "rub out" character and a + sign. These selector bars and also the selector space bars 6$^A$, 6$^B$, will operate for either position of the shift comb. The selector bar 6$^A$ when allowed to fall into its operative position, acts against the end portion 43$^d$ of the plate 43 so as to rock this plate about the pivot pin 44 and cause the shift comb 1$^A$ to move angularly to a small extent say into the position shown in Fig. 13, sufficient to permit one or other of the selector bars 6$^x$ of the second group of bars, corresponding to figures or special characters, to come into position to hold, in printing position, the printing wheel 31 which, in this case, is provided, in addition to ordinary letters or characters, with figures and special characters, and with a second gap for the formation of a space between printed figures or special characters. The selector bar 6$^B$ when allowed to fall, acts upon the other end portion 43$^e$ of the pivoted plate 43 and turns it and the shift comb 1$^A$ back into the original position for enabling any one of the ordinary selector bars 6 to come into position for the printing of ordinary characters. A wide notch 1$^B$ is formed in the portion of the shift comb 1$^A$ below the selector bars 6$^c$, 6$^d$ and the space selector bars 6$^A$, 6$^B$ so as to allow of any of these bars moving downward in either position of the shift comb 1$^A$, when allowed to do so by the setting of the combs 1. Each of these four bars has, of course, a combination of notches in the combs 1 special to itself. The notches 43$^b$ and 43$^c$ in the pivoted plate 43 form a clearance to permit the selector bars 6$^c$ and 6$^d$ to move downward when required. The shift comb 1$^A$ can be yieldingly held in each of its two positions by a roller 47 adapted to act against one or other side of the pin 46 by a spring blade 48 fixed to the ring 45 and acting against one end of a lever 49 pivoted at 50 to the ring 45 and the other end of which carries the said roller.

The telegraph transmitter used with the above described combined receiver and printer may advantageously be constructed in the manner described in the specification of my application for Letters Patent, Serial No. 745,934, filed Oct. 25, 1924.

When both a transmitter and a combined receiver and printer are provided at each of two stations, in order to keep a printed copy of the message transmitted, the main driving shafts of the transmitter and receiver may be rotated through gearing from a single motor so as to rotate at the same speed, which should correspond to that of the similar shafts of the transmitter and receiver located at a second station.

The combined receiver and printer hereinbefore described can be used in connection with an automatic telegraphic transmitter adapted to work continuously on the five or other multiple unit system. In this case the transmitter may be adapted to give a short time interval of say one or more unit lengths between the successive groups of five or other number of signals of unit length so as to give time for the comb setting fingers $i$ to set the combs 1 and to be returned to their normal position before the next group of signals are received, the mechanism operated by the cams being maintained in synchronism with the signals.

The synchronism may be maintained by sending between successive groups of signals, in a well known manner negative and positive signals in succession that are of constant length and act to correct the position of the sleeve $e$ on the shaft 28 if the sleeve is out of phase with the signals. The said shaft should be driven as nearly as possible in synchronism with the signals, or at a very slightly higher speed than synchronous speed. The synchronism between the movements of the mechanism actuated by the cams and the signals can however be maintained in any other way. For instance, the sleeve $e$ may be fixed to its driving shaft 28, and the speed of the motor driving the shaft be adjusted in known way, as by means of the correcting signals transmitted between the groups of signals, to ensure synchronism. Or the correcting signals may be replaced by no-current intervals between the groups of signals which may also serve for speed correcting purposes in a known way.

Figure 15:
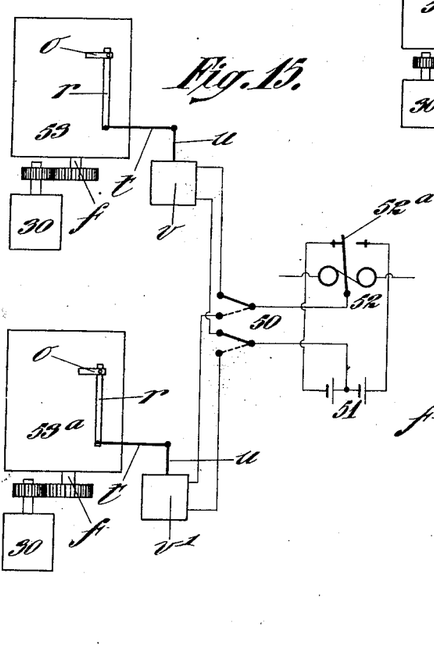
Figs. 15, 16 and 17 are diagrammatic views showing other modified arrangements.

According to the foregoing description, as there is a time interval between the reception of successive groups of signals, the efficiency of the telegraphic line wire is not used to its maximum extent. In cases where it is desired to utilize the line wire to its maximum extent and synchronism between the telegraphic transmitting and receiving apparatus is provided for in ways other than those hereinbefore referred to, two or more combined receivers and printers may be used and different groups of signals, belonging to different messages to be transmitted, may be utilized in succession in the several combined receivers and printers so that there need be no interval between the transmission of the successive groups of signals, thereby enabling the line wire to be used to its maximum extent. Fig. 15 shows one arrangement for this purpose, in which there are two combined receivers and printers, indicated respectively at 53 and 53$^a$, one designed for dealing with groups of signals corresponding to one message, say for distinction message A, to be received and printed, and the other for dealing with groups of signals corresponding to a separate and different message, say for distinction message B, to be received and printed. In this case the groups of signals corresponding to message A are transmitted to the relay $v$ of the combined receiver and printer at 53 and the groups of signals corresponding to message B are transmitted to the relay $v^1$ of the combined receiver and printer at 53$^a$, each group of signals corresponding to message A being succeeded by a group of signals corresponding to message B. In this case a current distributor 50 comprising a pair of contact arms is moved to and fro in synchronism with the line signals so that when a group of signals corresponding to message A is to be received, the contact arms will be in the full line position shown, so as to connect the terminals of relay $v$ of the combined receiver and printer at 53 to the middle point of a split battery 51 and the tongue 52$^a$ of a line relay 52 arranged to move between a pair of contacts connected to the positive and negative poles of the said battery, and when the succeeding group of signals, belonging to message B is to be received, the contact arms of the distributor 50 will be moved into the dotted line position shown, so as to connect the terminals of the relay $v^1$ of the combined receiver and printer at 53$^a$ to the middle point of the battery and relay tongue. In this way a time interval between succeeding groups of signals can be dispensed with.

Figures 13, 14:
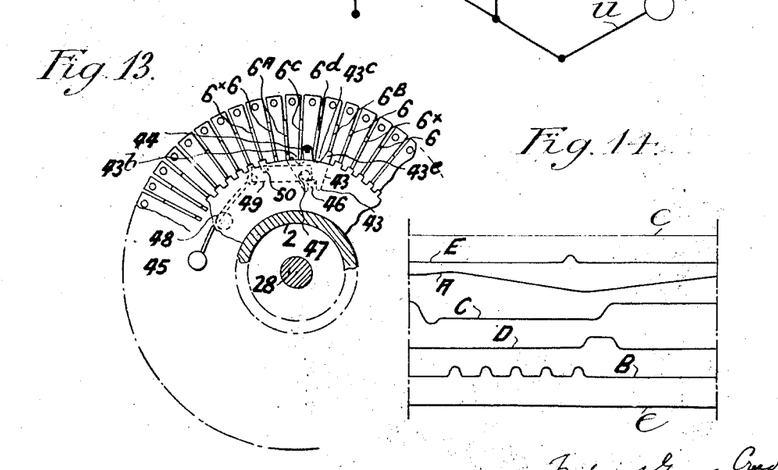
Fig. 13 is a detail view showing a shift comb.
Figs. 14 and 14ª are diagrammatic views of a set of cams.
Figure 14A:
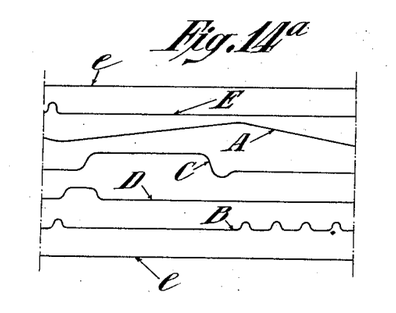
Figure 16:
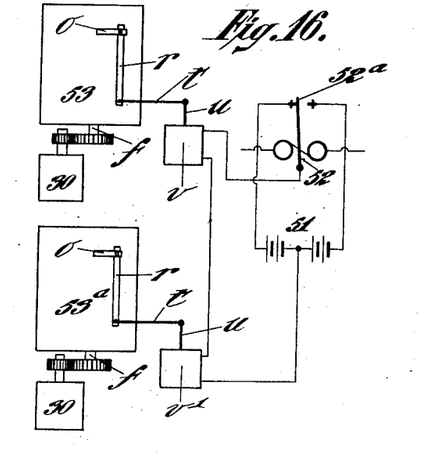

Fig. 16 shows a modified arrangement in which the relays $v$ and $v^1$ of the two combined receivers and printers at 53, 53$^a$ are connected in series to the middle point of the split battery 51 and tongue 52$^a$ of the line relay 52 so that the successive groups of signals belonging to both messages A and B pass through both relays $v$ and $v^1$. In this example, the two combined receivers and printers at 53 and 53$^a$ have separate driving shafts $f$. In order that those groups of signals that belong to message A shall only be effective for operating the combined receiver and printer at 53, and those belonging to message B shall only be effective for operating the combined receiver and printer at 53$^a$, the set of cam grooves A. B. C. D and E used in the two combined receivers and printers are modified as shown diagrammatically in Figs. 14 and 14$^a$. In this case each revolution of each set of cam grooves may be considered as comprising ten steps or stages, during five of which, cam grooves A, B and C of one set act as hereinbefore described, with reference to Figs. 1 to 12, on receipt of a group of signals, to move the finger setter $a$, striker blade $m$ and lift the control fingers $i$ into comb setting positions, and during the other five steps or stages, cam groove E acts to cause the type lever actuating device 23 to print the character or form the space corresponding to the previously received group of signals belonging to message A, or message B, as the case may be, and then the cam groove D acts first to move all the selector bars 6 from the combs 1 to allow the combs to be reset by the fingers to correspond to the last group of signals received corresponding to message A or message B, as the case may be, and then to release the selector bars 6 and allow them to move towards the reset combs and permit that bar 6 that corresponds to the last group of signals received, corresponding to message A, or message B, as the case may be, to enter a corresponding aligned set of notches in the said combs and arrest the printing wheel 31 in a position corresponding to the said group of signals of message A, or message B, as the case may be, last received, this sequence of operations taking place during each revolution. The two sets of cam grooves A, B, C, D, E in the two separate combined receivers and printers at 53 and 53$^a$, are however, as shown in Figs. 14 and 14$^a$, displaced angularly through an angle of 180° relatively to one another on their separate driving shafts $f, f$ (Fig. 16), so that when the cam grooves A. B and C of one set are acting in the manner just above described, the cam grooves A, B and C of the other set are inoperative on the parts they are designed to operate, and the cam grooves E and D of each set act in the manner described only when the cam grooves A B C of the other set of cam grooves are inoperative upon their associated parts.

Thus, it will be understood that although each succeeding group of signals corresponding to messages A and B will operate both relays $v$ and $v^1$, relay $v$ is only effective on the combined receiver and printer at 53 for groups of signals corresponding to messages A, and relay $v^1$ is only effective on the combined receiver at $53^a$ for groups of signals corresponding to messages B.

Figure 17:
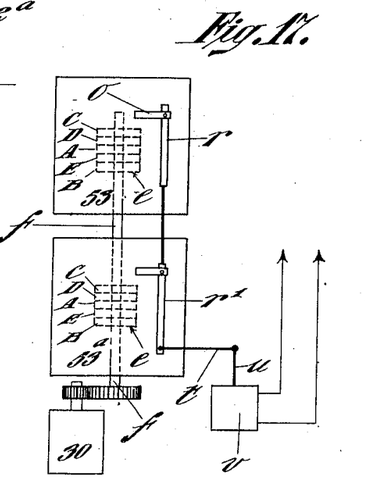

Fig. 17 shows a modified arrangement in which the two sets of cam grooves A B C D and E (Figs. 14 and $14^a$) for the two combined receivers and printers at 53 and $53^a$ are driven from a shaft $f$ common to them and the two rock shafts $r$ and $r^1$ of the two combined receivers and printers are operated by a single relay $v$ responsive to the succeeding groups of signals corresponding to the messages A and B. The two sets of cam grooves are in this case, also displaced through 180° relatively to one another, as in the arrangement shown in Fig. 16, so that although the two rock shafts $r$, $r^1$ will be moved simultaneously by the single relay $v$, just as they are in Fig. 16 by the two separate relays $v$ and $v^1$, only one will be operative at a time on its combined receiver and printer owing to the angular displacement of the two sets of cam grooves.

As in apparatus constructed and operating in the manner hereinbefore described, the setting of each control finger $i$ (Figs. 1 to 11) and $1^x$ (Fig. 12), by the finger setter $a$ or $a^1$, takes place in the middle portion of the reception of the corresponding signal, the apparatus can tolerate a considerable amount of distortion or lengthening of the received signals, due to the capacity effect of the telegraph line, without its accuracy of working being affected.

The details of construction of apparatus of the kind hereinbefore described can be variously modified to suit requirements without departing from the essential features of such apparatus.

Having now particularly described and ascertained the nature of my said invention and in what manner the same is to be performed, I declare that what I claim is:—

1. In telegraphic receiving apparatus, a series of independently movable control fingers, a finger setter, means for moving said finger setter to and fro past said control fingers, a relay responsive to the separate signals of each group of signals to be received, means under the control of said relay whereby the finger setter will be rendered operative or inoperative on the control finger opposite which it happens to be on the receipt of a signal, according to the character of the signal, and means the action of which is controlled in accordance with the relative setting of the series of control fingers.

2. In telegraphic receiving apparatus, a series of independently movable control fingers, a finger setter, means for moving said finger setter to and fro past said control fingers in synchronism with the signals to be received, a relay responsive to the separate signals of each group of signals to be received, means arranged to be operated in synchronism with the signals to be received and whereby the finger setter can be moved towards each of the control fingers in turn when brought opposite such finger and for afterwards returning it, means under the control of said relay whereby the finger setter will be rendered operative or inoperative on the control finger opposite which it happens to be at the moment a signal is received, according to the character of such signal, and mechanism controlled by said control fingers in accordance with their setting.

3. In telegraphic receiving apparatus, a series of independently movable control fingers, a finger setter, means for moving said finger setter to and fro past said control fingers in synchronism with the signals to be received, a relay responsive to the separate signals of each group of signals to be received, means arranged to be operated in synchronism with the signals to be received, whereby the finger setter can be moved towards each of the control fingers in turn when brought opposite to such finger, means under the control of said relay whereby the finger setter will be rendered operative or inoperative on the control finger opposite which it happens to be at the moment a signal is received, according to the character of the said signal, mechanism, the action of which is adapted to be controlled by said control fingers in accordance with their setting and means whereby the series of control fingers after being set to correspond to a received group of signals can be moved as a whole to control said mechanism.

4. In a telegraphic receiving apparatus, a series of independently movable control fingers, a finger setter, a cam for moving said finger setter to and fro past said control fingers, a relay responsive to the separate signals of each group of signals to be received, a pusher whereby the finger setter can be moved towards each of the control fingers in turn when brought opposite to said finger, said finger setter afterwards returning to normal position, a cam adapted to operate said pusher each time the finger setter comes opposite a control finger, means for actuating said cams so that said finger setter and pusher will be moved in synchronism with the successive signals received, means under the control of said relay whereby said pusher will be rendered operative or inoperative on said finger setter according to the character of the signal received and mechanism the action of which is adapted to be controlled by said control fingers in accordance with their setting.

5. In a telegraphic receiving apparatus, a series of independently movable control fingers, a finger setter, a cam for moving said finger setter to and fro past said control fingers, a relay responsive to the separate signals of each group of signals to be received, a pusher whereby the finger setter can be moved towards each of the control fingers in turn when brought opposite to said fingers, said finger setter afterwards returning to normal position, a cam adapted to operate said pusher each time the finger setter comes opposite a control finger, means for actuating said cams so that said finger setter and pusher will be moved in synchronism with the successive signals received, means under the control of said relay whereby said pusher will be rendered operative or inoperative on said finger setter according to the character of the signal received, mechanism adapted to be controlled by said fingers, means for moving the series of control fingers after being set to correspond to a received group of signals, to control said mechanism, a cam for actuating the said last mentioned means, and means for actuating said cams.

6. Telegraphic receiving apparatus according to claim 5, wherein the said three cams are formed as cam grooves in a rotary sleeve.

7. In telegraphic receiving apparatus, a series of independently movable control fingers, a finger setter, means for moving said finger setter to and fro past said control fingers, in synchronism with the signals to be received, a relay responsive to the separate signals of each group of signals to be received, means arranged to be operated in synchronism with the signals to be received, whereby the finger setter can be moved towards each of the control fingers in turn when brought opposite to such finger, means under the control of said relay whereby the finger setter will be rendered operative or inoperative on the control finger opposite which it happens to be at the moment a signal is received, according to the character of the said signal, and printing mechanism adapted, under control of said control fingers, to print a character or form a space in accordance with each group of signals received.

8. In telegraphic receiving apparatus, a series of independently movable control fingers, a finger setter, means for moving said finger setter to and fro past said control fingers, a relay responsive to the separate signals of each group of signals received, means under the control of said relay whereby the finger setter will be rendered operative or inoperative upon the control finger opposite which it happens to be on the receipt of a signal, according to the character of the signal, and printing mechanism the operation of which is controlled in accordance with the relative setting of the series of control fingers.

9. In telegraphic receiving apparatus, a series of independently movable control fingers, a finger setter, means for moving said finger setter to and fro past said control fingers, a relay responsive to the separate signals of each group of signals received, means under the control of said relay whereby the finger setter will be rendered operative or inoperative upon the control finger opposite which it happens to be on the receipt of a signal, according to the character of the signal, printing mechanism comprising a series of notched combs the relative positions of which control the printing of a character or the formation of a space, and means for moving the series of control fingers when set to correspond to a received signal, to correspondingly move the combs relatively to one another.

10. Telegraphic receiving apparatus comprising a series of independently movable control fingers, a finger setter, cam operated means for moving said finger setter to and fro past the control fingers, a relay responsive to the separate signals of each group of signals to be received, a cam operated pusher adapted to cause said finger setter to move each control finger opposite which it happens to be when a signal is received, means under the control of said relay whereby said pusher is rendered operative or inoperative on said finger setter according to the character of the signal received, a printer comprising a series of notched combs, a series of selector bars cooperating with said combs, cam operated mean for moving said selector bars from said notched combs, means for afterwards moving said selector bars toward said combs and causing one of them to enter an aligned set of notches therein, a printing wheel having a number of type carriers and an arresting arm adapted to be arrested by a selector bar that has moved into an aligned set of notches in said combs, a driving shaft, a yielding clutch between said shaft and printing wheel, a cam operated striker for causing any one of the type carriers brought opposite to it by the arresting arm, under the action of an operative selector bar, to print a character corresponding to the setting of the combs, and cam operated means for moving the said control fingers, after being set to correspond to a received group of signals, to set the combs to bring about the printing of a character or the formation of a space according to the group of signals received.

11. Telegraphic receiving apparatus comprising a series of independently movable control fingers, a finger setter, a cam and means operated thereby for moving said finger setter to and fro past said control fingers, a relay responsive to the separate signals of each group of signals received, a pusher, a cam and means operated thereby adapted to cause said pusher to move said finger setter towards and against each control finger in turn when brought opposite the same when a signal is received, means under the control of said relay whereby the means provided for actuating said pusher is rendered operative or inoperative on said finger setter according to the character of the signal received, a printer comprising a series of notched combs, a series of selector bars, a cam and means operated thereby for moving said selector bars from said combs, means for moving said selector bars towards said combs and causing one of them to enter an aligned set of notches therein, a printing wheel having a gap therein, a series of type carriers and an arresting arm adapted to be arrested by any one of the selector bars that has entered an aligned set of notches in said combs, a driving shaft, a yielding clutch between said printing wheel and shaft, a cam and means operated thereby for causing any one of the type carriers brought opposite to it by the arresting arm under the action of an operative selector bar to print a character corresponding to the setting of said combs, a cam and means operated therefrom for moving the set of control fingers after being set to correspond to a received group of signals, to set the combs to correspond to such setting of such control fingers, means for afterwards restoring the control fingers to normal position, a sleeve on which all of said cams are formed and a rotary shaft for rotating said sleeve and cams, the shaft for rotating the printing wheel being arranged to be driven at a greater speed than the shaft for rotating said sleeve and cams.

12. Telegraphic receiving apparatus according to claim 11 wherein the cams are in the form of grooves cut in said sleeve.

13. Telegraphic receiving apparatus according to claim 11 wherein the cam sleeve is adapted to be clutched to its driving shaft by the action of said relay upon the receipt of the first signal of a group of signals and to be automatically disconnected from such shaft after making a complete revolution.

14. Telegraphic receiving apparatus comprising two sets of signal receiving apparatus and printing apparatus according to claim 10 adapted to be controlled in succession by successive groups of signals.

15. In telegraphic receiving apparatus according to claim 10, a printing wheel having two sets of printing characters, a set of notched combs having two sets of notches, two sets of selector bars to cooperate with the two sets of notches in said combs, two special selector bars, each adapted to come into an operative position upon the receipt of a special group of signals, a shift comb adapted to admit of any one of the selector bars in either set thereof moving into operative position according to the position of said shift comb and means under the control of said special selector bars whereby said shift comb will be moved into one or other of its operative positions upon the receipt of a corresponding group of signals.

16. Telegraphic receiving apparatus comprising a series of independently movable control fingers, a finger setter, a cam and means operated thereby for moving said finger setter to and fro past said control fingers, a relay responsive to the separate signals of each group of signals received, a pusher, a cam and means operated thereby adapted to cause said pusher to move said finger setter towards and against each control finger in turn when brought opposite the same when a signal is received, means under the control of said relay whereby the means provided for actuating said pusher is rendered operative or inoperative on said finger setter according to the character of the signal received, a printer comprising a series of notched combs, a series of selector bars, a cam and means operated thereby for moving said selector bars from said combs, means for moving said selector bars towards said combs and causing one of them to enter an aligned set of notches therein, a printing wheel having a series of type carriers and an arresting arm adapted to be arrested by any one of the selector bars that has entered an aligned set of notches in said combs, a driving shaft, a yielding clutch between said printing wheel and shaft, a cam and means operated thereby for causing any one of the type carriers brought opposite to it by the arresting arm under the action of an operative selector bar to print a character corresponding to the setting of said combs, a cam and means operated therefrom for moving the set of control fingers after being set to correspond to a received group of signals, to set the combs to correspond to such setting of such control fingers, means for afterwards restoring the control fingers to normal position, a sleeve on which all of said cams are formed and a rotary shaft for rotating said sleeve and cams, the shaft for rotating the printing wheel being arranged to be driven at a greater speed than the shaft for rotating said sleeve and cams and such as is necessary to enable such shaft to make one full revolution and come to rest between the time when the selector bars are set and the time of the printing operation, and the cams being shaped accordingly so as to allow the maximum time for the exploring movement of the arresting arm.

Signed at Croydon, Surrey, England, this fifteenth day of October, 1924.

FREDERICK GEORGE CREED.